US011746754B2

(12) United States Patent
Thomsen

(10) Patent No.: US 11,746,754 B2
(45) Date of Patent: Sep. 5, 2023

(54) WIND TURBINE NACELLE STRUCTURE

(71) Applicant: Vestas Wind Systems A/S, Aarhus N. (DK)

(72) Inventor: Kristoffer Isbak Thomsen, Århus N (DK)

(73) Assignee: Vestas Wind Systems A/S, Aarhus N (DK)

( * ) Notice: Subject to any disclaimer, the term of this patent is extended or adjusted under 35 U.S.C. 154(b) by 579 days.

(21) Appl. No.: 16/865,450

(22) Filed: May 4, 2020

(65) Prior Publication Data

US 2020/0263670 A1 Aug. 20, 2020

Related U.S. Application Data

(62) Division of application No. 15/300,402, filed as application No. PCT/DK2015/050064 on Mar. 24, 2015, now Pat. No. 10,753,340.

(30) Foreign Application Priority Data

Mar. 31, 2014 (DK) .......................... PA 2014 70164

(51) Int. Cl.
*F03D 80/00* (2016.01)
*F03D 80/50* (2016.01)
(Continued)

(52) U.S. Cl.
CPC .............. *F03D 80/00* (2016.05); *F03D 9/25* (2016.05); *F03D 80/50* (2016.05); *F03D 80/88* (2016.05);
(Continued)

(58) Field of Classification Search
CPC ........ F03D 80/00; F03D 80/50; F03D 559/25; F05B 2230/61; F05B 2230/71;
(Continued)

(56) References Cited

U.S. PATENT DOCUMENTS 6,892,504 B1  5/2005  diGirolamo et al.
6,920,724 B1  7/2005  Hundley
(Continued)

FOREIGN PATENT DOCUMENTS

CN   101479470 A   7/2009
CN   201730762 U   2/2011
(Continued)

OTHER PUBLICATIONS

European Patent Office, International Search Report and Written Opinion, Issued in PCT Application No. PCT/DK2015/050064, dated Jun. 15, 2015.
(Continued)

*Primary Examiner* — Justin D Seabe
*Assistant Examiner* — Aye S Htay
(74) *Attorney, Agent, or Firm* — Wood Herron & Evans LLP

(57) ABSTRACT

A wind turbine includes a nacelle which houses components including a generator connected to a rotor. The nacelle includes a cover and a skeleton, the skeleton including a plurality of connected elongated skeleton members. The skeleton members include a first skeleton member, a second skeleton member non-parallel to the first skeleton member, and a bolt extending in parallel with the second skeleton member for connecting the second skeleton member and the first skeleton member. Also, a method is presented for removing a component housed in a nacelle of a wind turbine, including disconnecting a second skeleton member from first skeleton members, removing the second skeleton member from a path of removal of the component, and removing the component along the path.

10 Claims, 6 Drawing Sheets

(51) Int. Cl.
*F03D 80/80* (2016.01)
*F03D 9/25* (2016.01)

(52) U.S. Cl.
CPC ....... *F05B 2230/61* (2013.01); *F05B 2230/70* (2013.01); *F05B 2240/14* (2013.01); *F05B 2240/221* (2013.01); *F05B 2240/912* (2013.01); *Y02E 10/72* (2013.01); *Y02E 10/728* (2013.01); *Y02P 70/50* (2015.11)

(58) Field of Classification Search
CPC ............ F05B 2240/14; F05B 2240/221; F05B 2240/912; Y02P 70/50; Y02E 10/72; Y02E 10/728
See application file for complete search history.

(56) References Cited

U.S. PATENT DOCUMENTS

| | | | |
|---|---|---|---|
| 8,087,896 | B2 | 1/2012 | Pederson |
| 8,104,631 | B2* | 1/2012 | Stegemann ............ B66C 23/06 212/179 |
| 2007/0200103 | A1* | 8/2007 | Viladomiu i Guarro .................... B66C 23/207 254/334 |
| 2010/0011575 | A1* | 1/2010 | Numajiri ................ B66C 17/04 29/889.1 |
| 2011/0101699 | A1 | 5/2011 | Segovia et al. |
| 2011/0138595 | A1 | 6/2011 | Shiraishi et al. |
| 2011/0142616 | A1 | 6/2011 | Christensen |
| 2011/0204649 | A1 | 8/2011 | Segovia et al. |
| 2011/0309629 | A1 | 12/2011 | Larsen et al. |
| 2012/0073134 | A1 | 3/2012 | Bywaters et al. |
| 2012/0205915 | A1 | 8/2012 | Liingaard et al. |
| 2012/0282099 | A1 | 11/2012 | Munk-Hansen |
| 2013/0183162 | A1 | 7/2013 | Cruden |
| 2013/0229017 | A1 | 9/2013 | Tobinaga |
| 2013/0309090 | A1* | 11/2013 | Abolfazlian ............ F01D 25/12 416/1 |
| 2016/0160843 | A1 | 6/2016 | Jensen |
| 2017/0022966 | A1* | 1/2017 | Therkildsen ............ F03D 80/88 |

FOREIGN PATENT DOCUMENTS

| | | | | |
|---|---|---|---|---|
| CN | 102052262 | A | 5/2011 | |
| CN | 102858590 | A | 1/2013 | |
| EP | 1677006 | A2 * | 7/2006 | ........... B66C 23/207 |
| EP | 1677007 | A2 * | 7/2006 | ........... B66C 23/207 |
| WO | 2004003381 | A1 | 1/2004 | |
| WO | 2008000267 | A1 | 1/2008 | |
| WO | 2011117005 | A2 | 9/2011 | |
| WO | 2012107049 | A1 | 8/2012 | |
| WO | 2014037507 | A1 | 3/2014 | |

OTHER PUBLICATIONS

Danish Patent and Trademark Office, Search Report in Application No. PA 2014 70164, dated Nov. 14, 2014.
The State Intellectual Property Office of China, First Notification of Office Action in CN Application No. 201580015348.0, dated Apr. 20, 2018.
China National Intellectual Property Administration, 2nd Notification of Office Action in CN Application No. 201580015348.0, dated Nov. 27, 2018.
China National Intellectual Property Administration, 3rd Notification of Office Action in CN Application No. 201580015348.0, dated Apr. 23, 2019.
Government of India, Examination Report in IN Application No. 201647037004, dated Nov. 8, 2019.

* cited by examiner

WIND TURBINE NACELLE STRUCTURE

CROSS REFERENCE TO RELATED APPLICATIONS

This application is a divisional of U.S. patent application Ser. No. 15/300,402, filed Sep. 29, 2016 (pending), which is a U.S. National Phase Application of International Application No. PCT/DK2015/050064, filed Mar. 24, 2015 (expired), which claimed the benefit of Denmark Patent Application No. PA 2014 70164, filed Mar. 31, 2014, the disclosures of which are incorporated by reference herein in their entirety.

TECHNICAL FIELD

The invention relates to a wind turbine, in particular a horizontal axis wind turbine, comprising a nacelle, mounted on a tower, the nacelle housing components including a generator connected to a rotor, the nacelle comprising a cover and a skeleton, the skeleton comprising a plurality of connected elongated skeleton members. The invention also relates to a method for removing a component housed in a nacelle of a wind turbine.

BACKGROUND OF THE INVENTION

In the trend of wind turbine models growing in size, the design of the nacelles can creates challenges. In particular, the nacelle needs to be provided with a structure suited for carrying large loads, and also for facilitating service of parts in the nacelle.

WO2008000267A1 discloses a handling system for a wind turbine nacelle in connection with self-loading or self-unloading of the nacelle to or from a vehicle.

SUMMARY

It is an object of the invention to improve the structure of wind turbine nacelles. It is also an object of the invention to provide for a wind turbine nacelle to effectively carry loads, while also facilitating service of parts in the nacelle.

These objects are solved by a wind turbine comprising a nacelle, mounted on a tower, the nacelle housing components including a generator connected to a rotor of the wind turbine, the nacelle comprising a cover and a skeleton to which the cover is attached, the skeleton comprising a plurality of connected elongated skeleton members, the skeleton members comprising a first skeleton member and a second skeleton member being non-parallel to the first skeleton member, a bolt extending in parallel with the second skeleton member being provided for a connection between the second skeleton member and the first skeleton member. Preferably, the skeleton members are straight.

Thus, the second skeleton member can be connected to the first skeleton member with at least one bolt extending in parallel with the second skeleton member. The bolt connection provides for removal of the second skeleton member, e.g., for clearing the path for a component to be removed from the nacelle during a service operation. Also, the bolt extending in parallel with the skeleton member gives the possibility to provide pre-tension in the second skeleton member when mounting it to the first skeleton member, which is beneficial from a structural point of view.

Preferably, the bolt extends coaxially with the second skeleton member. Thereby, a pre-tension load provided by the bolt will be aligned with the second skeleton member, avoiding bending moments in the latter.

Preferably, the first skeleton member presents a contour with a concavity, the bolt, preferably the pin of the bolt, extending through the concavity. The contour with the concavity can for example be provided by a protruding ear of the first skeleton member. Thereby, the second skeleton member can be easily disassembled from the first skeleton member by loosening the bolt and moving the second skeleton member laterally so that the bolt pin leaves the concavity.

Preferably, the skeleton members comprise two parallel first skeleton members connected by at least one second skeleton member, the second skeleton member forming an angle to the first skeleton members which angle is larger than zero degrees and smaller than 90 degrees, preferably between 20 and 70 degrees, preferably between 30 and 60 degrees, preferably 45 degrees. Where the skeleton members comprise two parallel first skeleton members, these could be connected by at least two second skeleton members arranged in an X-shaped configuration. The two parallel first skeleton members could extend substantially in parallel to a rotational axis of the rotor, and preferably, as seen from above, on opposite sides of the rotational axis of the rotor.

The invention also provides a method for removing a component housed in a nacelle of a wind turbine, the nacelle being mounted on a tower, the nacelle comprising a cover and a skeleton to which the cover is attached, the skeleton comprising a plurality of connected elongated skeleton members, the skeleton members comprising a first skeleton member and a second skeleton member, the second skeleton member being connected to the first skeleton member, the second skeleton member being in a path of removal of the component, the method comprising disconnecting the second skeleton member from the first skeleton members, removing the second skeleton member from said path, and removing the component along said path. Thereby, a high degree of optimisation of the load carrying capacity of the nacelle structure can be obtained, while at the same time providing for good service solutions in relation to components in the nacelle.

Where the second skeleton member is, before being removed from said path, located above the component, removing the component along said path may comprise lifting the component by means of a crane. The first skeleton members could extend in parallel to each other and substantially in parallel to a rotational axis of a rotor of the wind turbine, and, as seen from above, on opposite sides of the rotational axis of the rotor. Thereby the component could be removed along said path between the first skeleton members.

The method could further include, for example at the end of a service procedure, introducing the component or another component along said path, into the nacelle, and connecting the second skeleton member to the first skeleton members.

DESCRIPTION OF THE DRAWINGS

Below embodiments of the invention will be described with reference to the drawings, in which.

DETAILED DESCRIPTION

Figure 1:
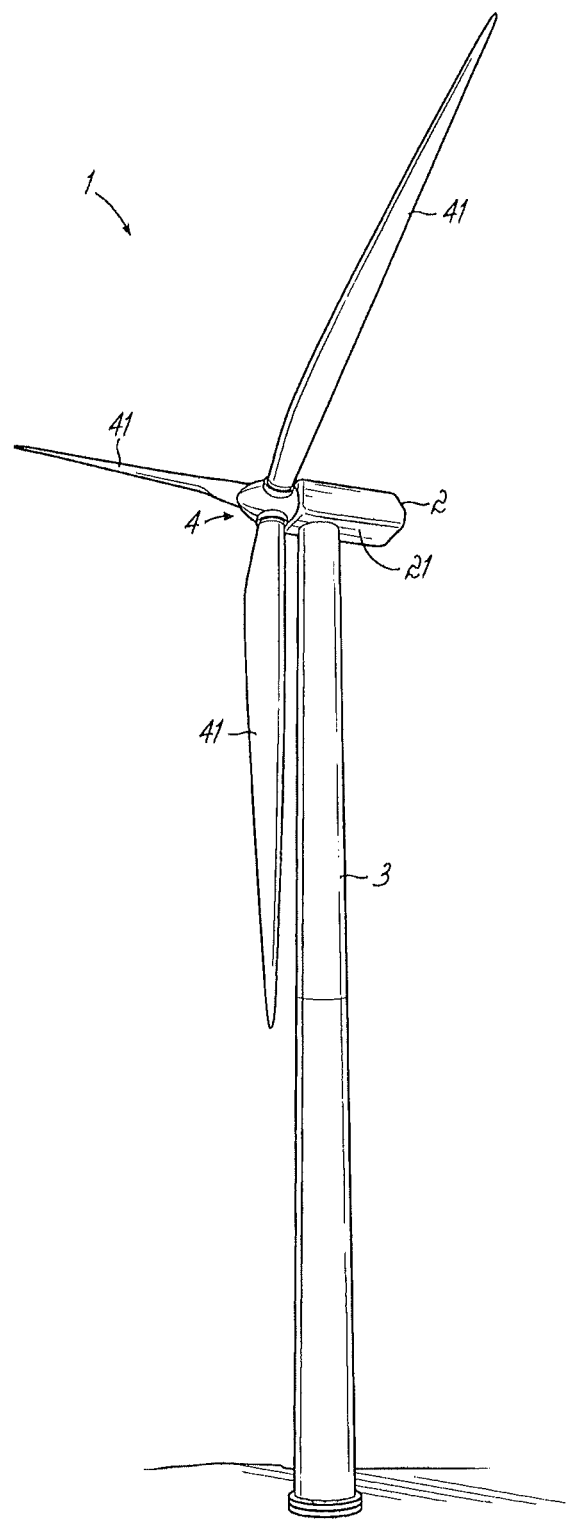
FIG. 1 shows a perspective view of a wind turbine.

FIG. 1 shows a horizontal axis wind turbine 1 comprising a nacelle 2, mounted on a tower 3. The nacelle 2 has a cover 21 and houses components including a generator connected to a rotor 4, which in this example comprises three blades 41.

Figure 2:
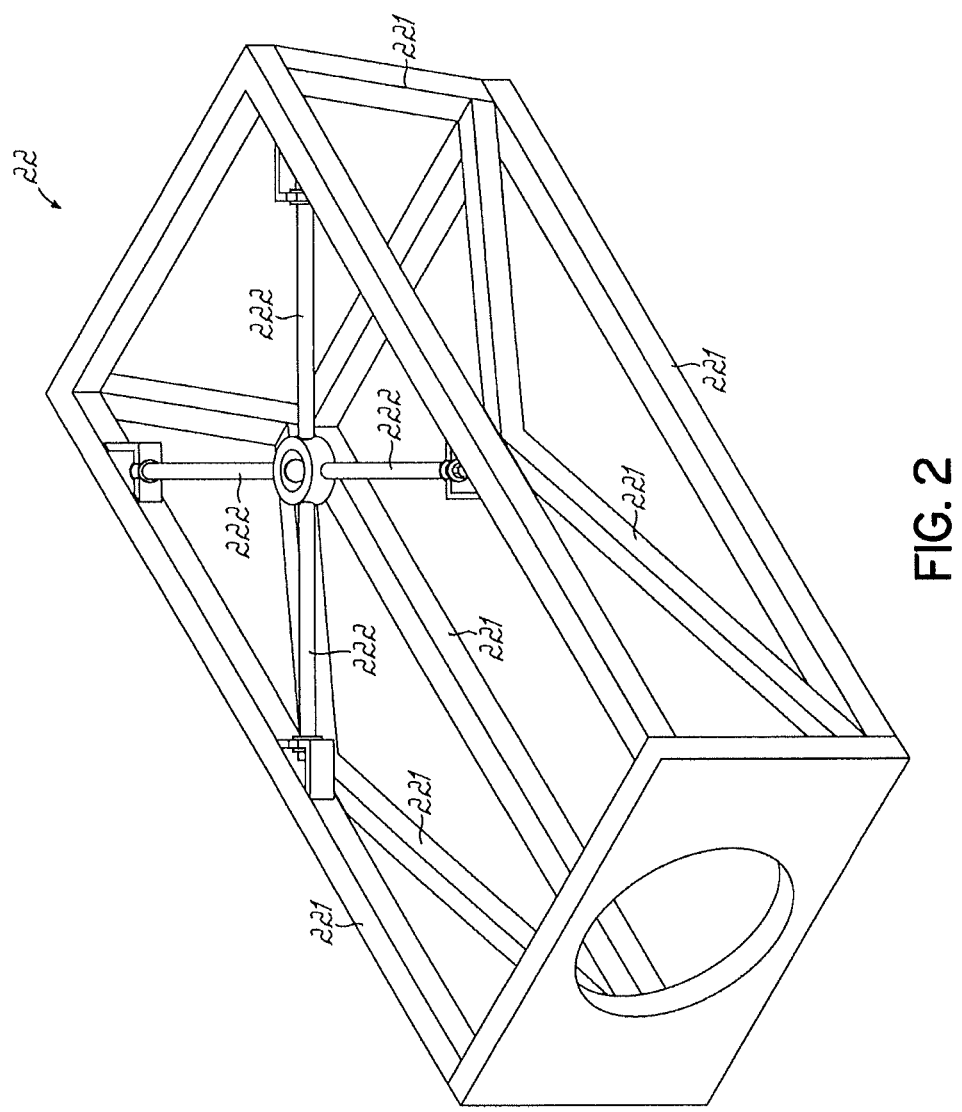
FIG. 2 shows a perspective view of a skeleton of a nacelle of the wind turbine in FIG. 1, according to an embodiment of the invention.

FIG. 2 shows a skeleton 22 of the nacelle 2. The cover 21 in FIG. 1 is mounted to the skeleton 22, which comprises a plurality of connected elongated straight skeleton members. The skeleton members comprise first skeleton members 221 and second skeleton members 222. The first skeleton members 221 are connected to each other, e.g., by bolting or welding.

Figure 3:
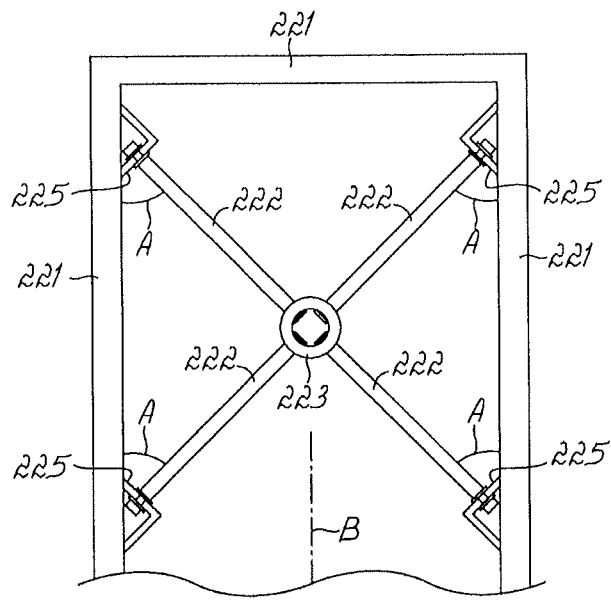
FIG. 3 shows a top view of a part of the skeleton in FIG. 2.

FIG. 3 shows how four second skeleton members 222 are mounted to two parallel first skeleton members 221 such that the second skeleton members 222 are non-parallel to the first skeleton members 221. More particularly, the second skeleton members 222 form 45 degree angles A to the first skeleton members 221. The four second skeleton members 222 are at respective ends thereof mounted by bolting or welding to a central bracket 223. At opposite respective ends the second skeleton members 222 are mounted to the first skeleton members 221. Thereby, the second skeleton members 222 are arranged in an X-shaped configuration. The two first skeleton members 221 extend in parallel to, and on opposite sides of, a rotational axis B, (indicated with a broken line), of the rotor 4, (FIG. 1), of the wind turbine.

Figure 4:
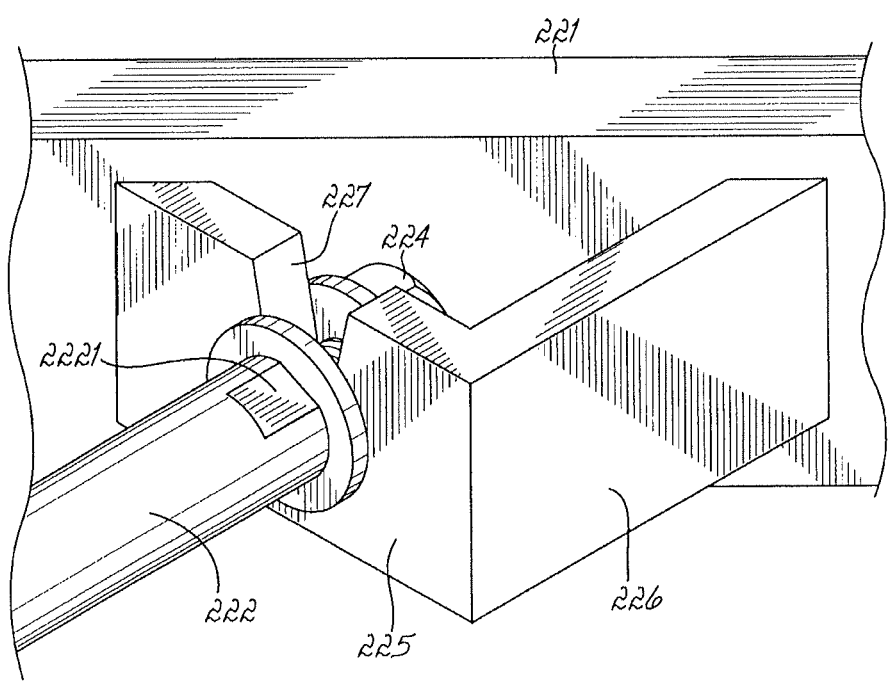
FIG. 4 shows a perspective view of a detail of the skeleton in FIG. 2.
Figure 5:
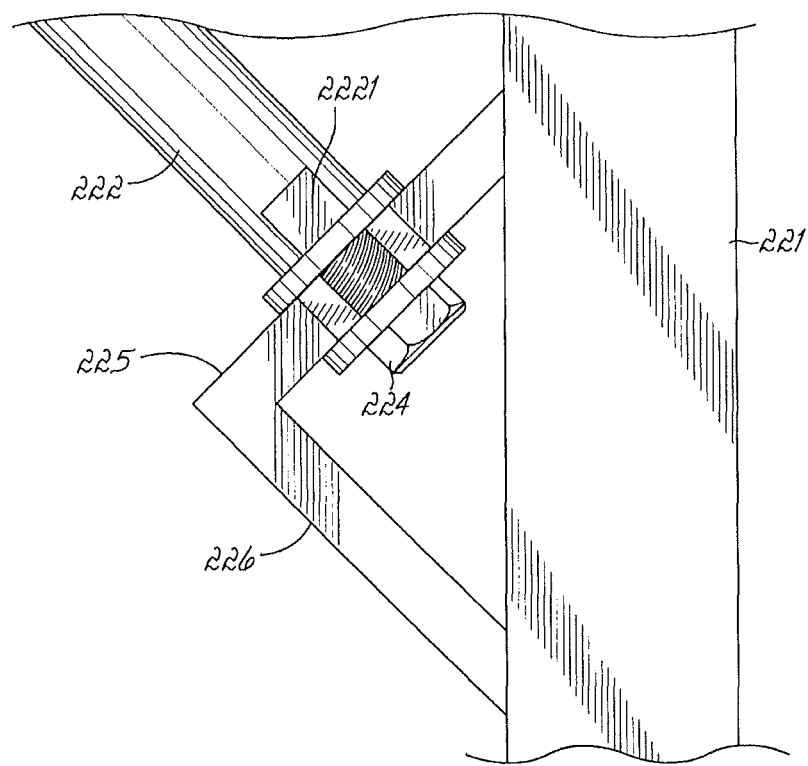
FIG. 5 shows a top view of the detail in FIG. 4, FIG. 6 and FIG. 7 show respective top views of a part of a nacelle skeleton according to alternative embodiments of the invention.

FIG. 4 and FIG. 5 show how each of the second skeleton members 222 are connected to one of the first skeleton members 221 with a bolt 224 extending in parallel with the respective second skeleton member 222. The bolt 224 extends coaxially with the second skeleton member 222. The first skeleton member 221 presents a protruding planar ear 225, which is supported at its distal end by a support element 226, such that the ear forms a 45 degree angle to the longitudinal direction of the first skeleton member 221. As can be seen in FIG. 4, the ear 225 presents a contour with a concavity 227, and the pin of the bolt 224 extends through the concavity 227.

The head of the bolt rests against the ear 225 via an intermediate washer, and its threaded pin extends through the concavity 227 into a female thread in the second skeleton member 222. The second skeleton members 222 are slightly shorter than what is needed to extend between the ears 225 of the first skeleton members 221. By turning the bolts 224, while holding the second skeleton members 222 with a suitable tool at flattened portions 2221 to prevent their rotation, the second skeleton members 222 can be pre-tensioned during their installation. This is beneficial from a structural point of view. Also, the fact that the bolts 224 extend coaxially with the second skeleton members 222, the pre-tension load provided by the bolts 224 will be aligned with the second skeleton members 222, avoiding bending moments in the latter.

Figure 6:
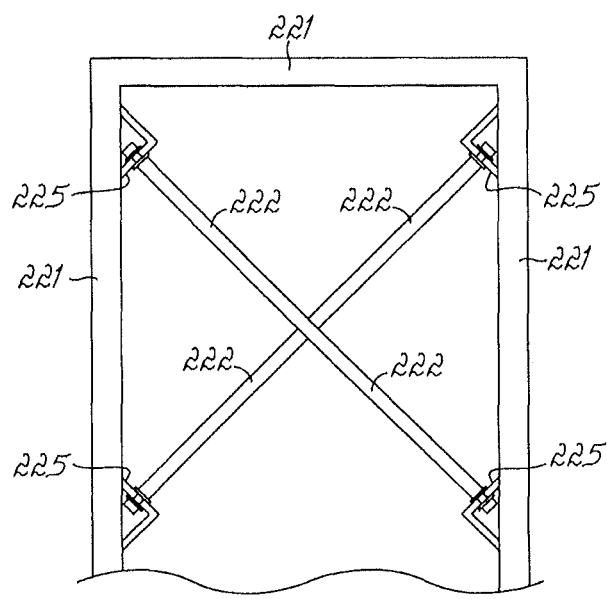

FIG. 6 shows an alternative embodiment of the invention, in which two second skeleton members 222 are mounted to two parallel first skeleton members 221, thereby forming an X-shaped configuration. For this the ears 225 are arranged so that the two second skeleton members 222 are offset in a vertical direction.

Figure 7:
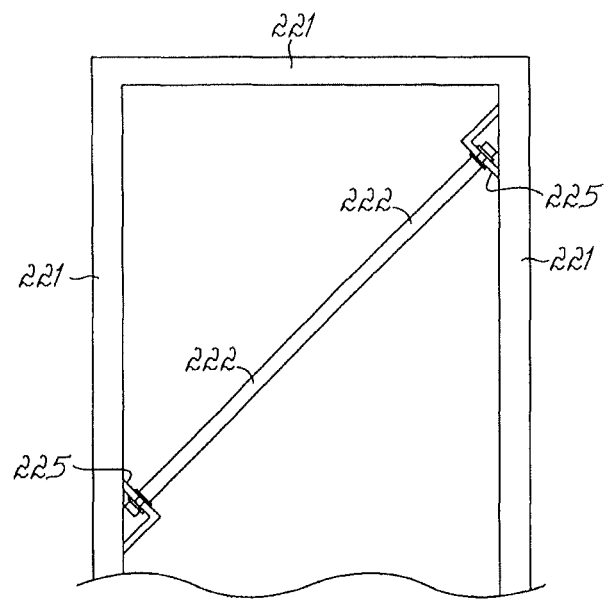

FIG. 7 shows a further alternative embodiment of the invention, in which only one second skeleton member 222 is mounted between two parallel first skeleton members 221.

Figure 8:
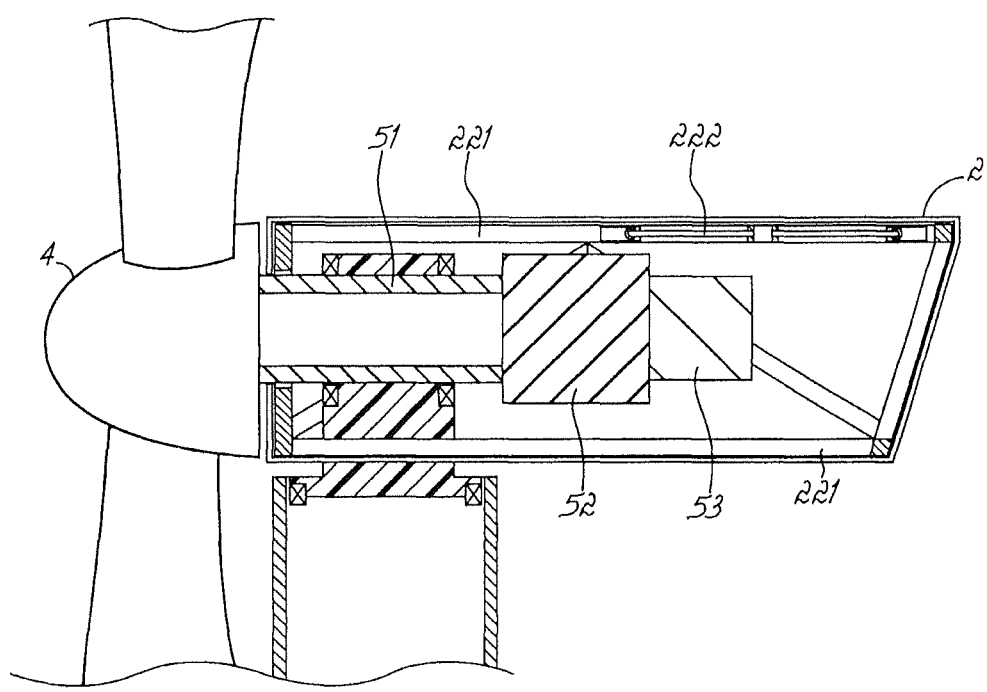
FIG. 8 shows a partly sectioned side view of a part of the wind turbine in FIG. 1.
Figure 9:
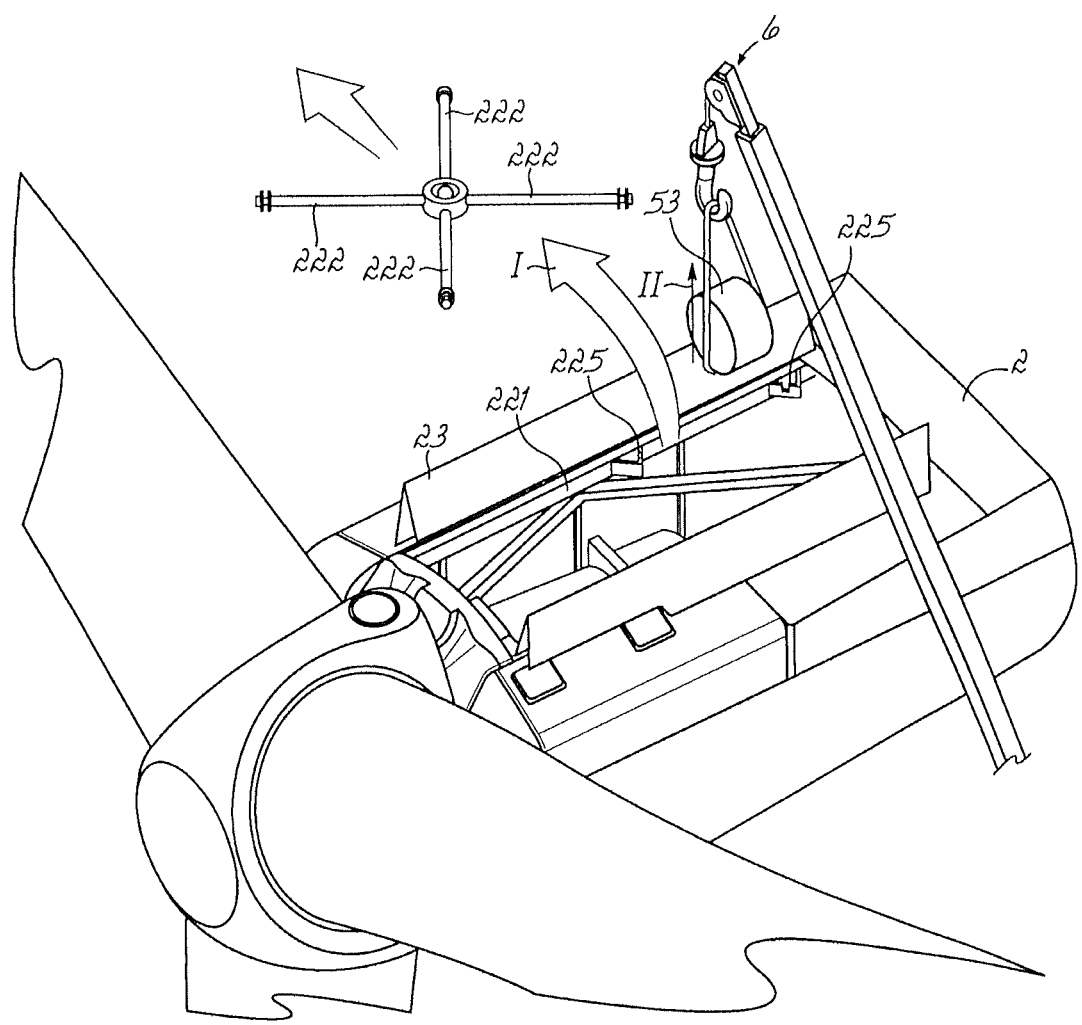
FIG. 9 shows a perspective view of a part of the wind turbine in FIG. 1, illustrating steps in a method according to an embodiment of the invention.

FIG. 8 and FIG. 9 illustrate an embodiment of a method for removing a component housed in the nacelle 2 of the wind turbine described above with reference to FIG. 1 to FIG. 5. As can be seen in FIG. 8, the rotor 4 is connected to components in the nacelle 2 in the form of a main shaft 51, a gear box 52, and a generator 53. It can be seen that the generator 53 is located under the second skeleton members 222. Thereby, the second skeleton members 222 are in a path of removal of the generator 53 for service purposes.

As illustrated in FIG. 9, the method comprises opening a door 23 of a roof hatch of the nacelle, and disconnecting the second skeleton members 222 from the first skeleton members 221. This disconnection is done by loosening the bolts 224, (FIG. 4 and FIG. 5), and lifting them out of the concavities 227 of the ears 225 of the first skeleton members 221. Thereafter the second skeleton members 222 are removed with the central connecting bracket 223, as illustrated with the arrow I in FIG. 9. Thereby said path is cleared for removing for service purposes the generator 53. The generator 53 is removed from the nacelle 2 along said path by lifting with the aid of a crane 6, as illustrated by the arrow II.

Thus, the connections with bolts 224 and ear concavities 227 provide for easy removal of the second skeleton members 222, for clearing the path for a component 53 to be removed from the nacelle during a service operation. Thereby, a good service solution for components in the nacelle is provided by removing the second skeleton members, which nevertheless can form an essential part of the load carrying nacelle structure during normal wind turbine operation. At the end of a service procedure, the component 53 or a replacement component could be introduced along said path, back into the nacelle, and the second skeleton members 222 could be reconnected to the first skeleton members 221.

The invention claimed is:

1. A method for servicing a component housed in a nacelle of a wind turbine, the nacelle being mounted on a tower, the nacelle comprising a cover and a skeleton to which the cover is attached, the skeleton comprising a plurality of connected elongated skeleton members positioned above the component, the skeleton members comprising two first skeleton members connected by at least one second skeleton member, the at least one second skeleton member being immovable relative to the two first skeleton members when connected together, the method comprising:

disconnecting the at least one second skeleton member from the first skeleton members;

removing the at least one second skeleton member from a path of removal of the component; and removing the component along the path of removal such that the component passes through the space previously occupied by the at least one second skeleton member.

2. The method according to claim 1, wherein the at least one second skeleton member is connected to each of the first skeleton members by a bolt that extends in parallel with the at least one second skeleton member, and wherein the disconnecting the at least one second skeleton member from the first skeleton members further comprises rotating each corresponding bolt to loosen the connection therebetween.

3. The method according to claim 2, wherein the removing the at least one second skeleton member further comprises removing the at least one second skeleton member with the bolts remaining attached to the at least one second skeleton member.

4. The method according to claim 1, wherein the removing the at least one second skeleton member further comprises lifting the at least one second member in a vertical direction to disengage the at least one second skeleton member from the first skeleton members.

5. The method according to claim 1, wherein the removing the component along the path of removal further comprises lifting the component vertically along the path of removal by means of a crane.

6. The method according to claim 1, further comprising opening a roof hatch in the nacelle before removing the component, wherein the at least one second skeleton member is, before being removed, disposed in the path between the component and the roof hatch.

7. The method according to claim 1, further comprising:
introducing the component or another component along the path and into the nacelle; and
reconnecting the at least one second skeleton member to the first skeleton members.

8. The method according to claim 1, wherein the first skeleton members extend in parallel to each other and substantially in parallel to a rotational axis of a rotor of the wind turbine and on opposite sides of the rotational axis of the rotor.

9. The method according to claim 1, wherein the component is a generator of a wind turbine.

10. The method according to claim 1, wherein the two first skeleton members define a plane, and wherein the at least one second skeleton member lies in the plane.

* * * * *